United States Patent [19]

Sofinowski

[11] Patent Number: 4,815,343
[45] Date of Patent: Mar. 28, 1989

[54] ROBOTIC DIE MOUNTING MECHANISM AND METHOD

[75] Inventor: John R. Sofinowski, Glen Arm, Md.

[73] Assignee: United Container Machinery Group, Inc., Glen Arm, Md.

[21] Appl. No.: 116,824

[22] Filed: Nov. 5, 1987

[51] Int. Cl.$^4$ .................. B25B 23/02; B25B 23/04; B25B 23/06

[52] U.S. Cl. .................. 81/57.37; 81/431; 81/433; 81/435

[58] Field of Search .................. 81/57.39, 431, 432, 81/433, 435, 54

[56] References Cited

U.S. PATENT DOCUMENTS

| | | | |
|---|---|---|---|
| 2,689,589 | 9/1954 | Allen et al. | 81/57.37 |
| 2,843,166 | 7/1958 | Van Alstyne | 81/57.37 |
| 4,362,977 | 12/1982 | Evans et al. | 318/568 |
| 4,379,335 | 4/1983 | Kirsch et al. | 364/513 |
| 4,445,022 | 4/1984 | Mori | 219/125.1 |
| 4,602,345 | 7/1986 | Yokoyama | 364/513 |

Primary Examiner—Frederick R. Schmidt
Assistant Examiner—Maurina Rachuba
Attorney, Agent, or Firm—Biebel, French & Nauman

[57] ABSTRACT

A robotic die mounting mechanism can be used to apply or remove fasteners to or from aligned locations such as pre-drilled and pre-tapped holes in a cutting die and backing drum for attaching or detaching the die to or from the drum. The mounting mechanism including a fastener supply magazine with a dispensing chute, a robotic arm, a socket on a rotary driver, and an actuator mounting the driver. The magazine holds a supply of the fasteners and its chute dispenses one fastener at a time from the magazine. The robotic arm movable between a fastener pickup position adjacent the magazine chute and a fastener discharge position remote therefrom and above the die and drum receives one fastener at a time from the magazine chute and transfers the fastener from the fastener pickup position to the fastener discharge position. The socket on the rotary driver engages the fastener at the fastener discharge position. Upon actuation of the actuator, the rotary drill and the socket therewith are moved to advance the fastener from the fastener discharge position to a fastener applying position adjacent to the die and drum. The driver is then actuated to rotate the socket and apply the fastener to the aligned locations on the die and drum. Reversal of the steps will effectuate removal of the fastener from the die and drum and its delivery back to the supply magazine.

11 Claims, 3 Drawing Sheets

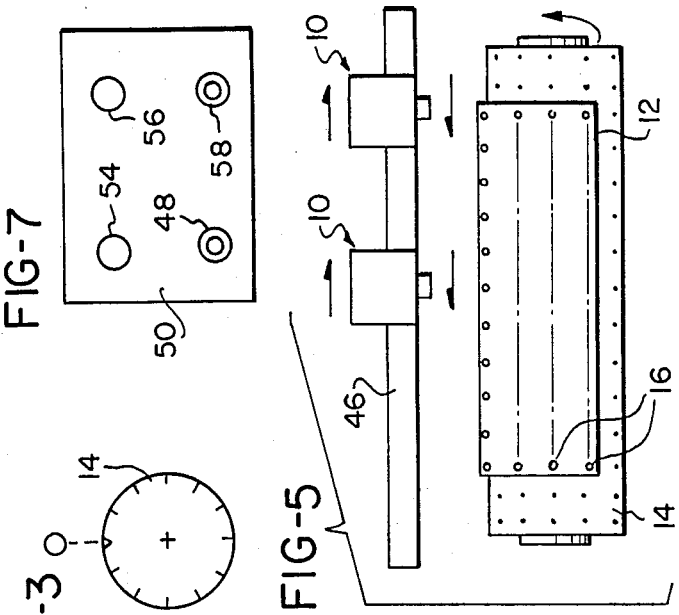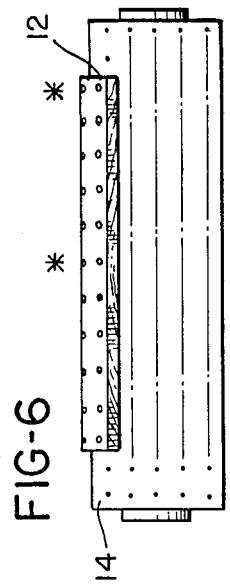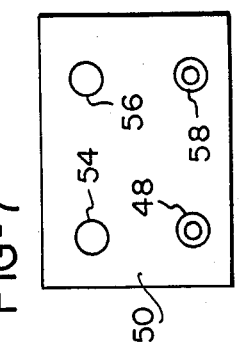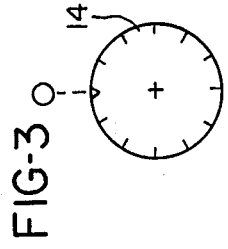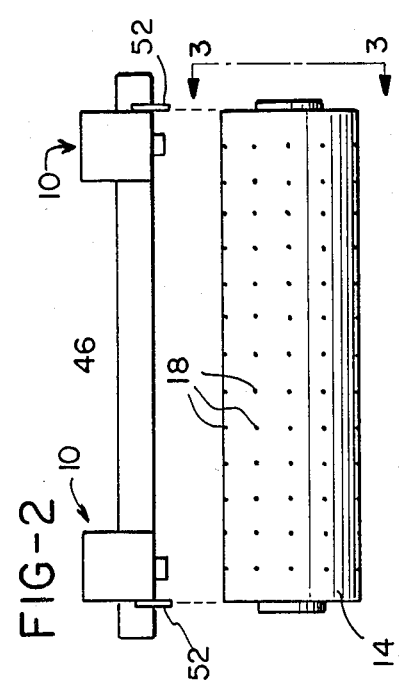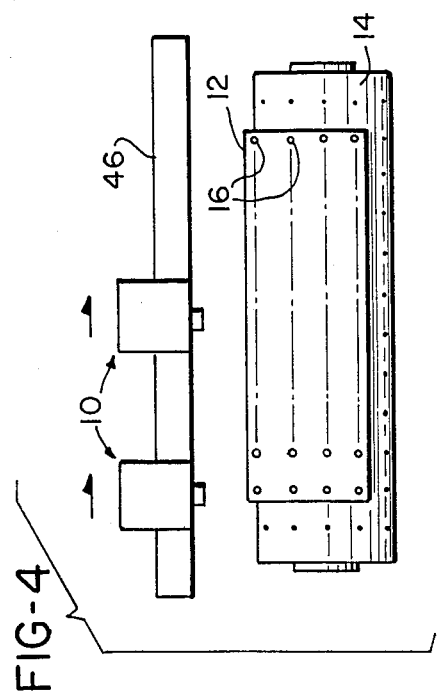

ROBOTIC DIE MOUNTING MECHANISM AND METHOD

BACKGROUND OF THE INVENTION

The present invention generally relates to die cutting processes and, more particularly, to a mechanism and method for robotically mounting a die on a rotary die cutter backing drum.

In the corrugated cardboard container industry, it is common practice to first fabricate corrugated board as a continuous web and then cut the web into pieces of a desired length. A die cutting process is then used to cut and score the pieces to produce container blanks of desired sizes and shapes.

Typically, in setting up the equipment for production of container blanks of a desired size and shape, a cutting die in the form of a plywood substrate having cutting and scoring knives attached thereon in the proper configuration to product the blanks is first mounted on a backing drum of a rotary die cutter. The backing drum of the rotary die cutter and the plywood substrate of the cutting die have holes which are pre-tapped and pre-drilled, respectively, and arranged in identical patterns for receiving screws to fasten securely the cutting die onto the drum.

One major shortcoming of the prior art setup procedure is that a person is required to manually place the cutting die on the rotary drum and then install all of the screws required to mount the cutting die and draw it down to the surface of the drum. This is a labor-intensive and time-consuming task which constrains the overall productivity that can be achieved.

Consequently, a need exists for a different approach to cutting die setup which will allow improvement in productivity.

SUMMARY OF THE INVENTION

The present invention provides a robotic die mounting mechanism and method designed to satisfy the aforementioned needs. The mechanism and method of the present invention provide an approach which reduces the amount of time that a person needs to be present at the rotary die cutter during a die changeover. By use of multiple mounting mechanisms the setup time can be drastically reduced. For example, by using a pair of the mounting mechanisms the setup time could be cut approximately in half.

Accordingly, the present invention is directed to a robotic die mounting mechanism which is useful for applying a plurality of fasteners to a plurality of aligned locations on a cutting die and a backing drum for attaching the die to the drum. The mounting mechanism comprises: (a) means for holding a supply of the fasteners and for dispensing the fasteners; (b) means for engaging the fasteners and being operable for applying the fasteners to the aligned locations on the die and drum; (c) means attached to the fastener applying means and being movable toward and away from the die and drum for moving the fastener applying means between a fastener applying position adjacent the die and drum and a fastener receiving position remote therefrom; and (d) means movable between a fastener pickup position adjacent the fastener holding and dispensing means and a fastener discharge position adjacent the fastener receiving position of the fastener applying means for receiving and then transferring the fasteners from the fastener holding and dispensing means to the fastener applying means. More particularly, the fasteners are dispensed from the holding and dispensing means, are transferred by the transferring means, and are engaged and applied by the applying means one at a time to one of the aligned locations of the die and drum.

Further, the present invention is directed to a robotic die mounting method useful for applying a plurality of fasteners to a plurality of aligned locations on a cutting die and a backing drum for attaching the die to the drum. The method comprises the steps of: (a) holding a supply of the fasteners at a storage location; (b) dispensing one fastener at a time from the storage location; (c) transferring one fastener at a time along a first path from a fastener pickup position adjacent to the storage location to a fastener discharge position remote from the storage location and the die and drum; (d) advancing one fastener at a time along a second path from the fastener discharge position to a fastener applying position adjacent to the die and drum; and (e) applying one fastener at a time to the aligned locations on the die and drum. Also, the method includes the steps of (f) reversing steps (d) and (e) to remove one fastener at a time from the die and drum; and (g) transferring one fastener at a time along a third path from the fastener discharge position to the storage location.

Accordingly, it is an object of the present invention to provide a robotic die mounting mechanism and method capable of performing both cutting die setup and removal procedures; to provide a robotic die mounting mechanism and method which reduces the degree of manual labor required to carryout die changeover and setup procedures; to provide a robotic die mounting mechanism and method which frees an operator to attend to other tasks while the procedures are being performed mechanically; and to provide a robotic die mounting mechanism and method offering the potential for significant improvements in producitvity.

BRIEF DESCRIPTION OF THE DRAWINGS

FIG. 2 is a front schematical representation of a rotary die cutter backing drum prior to placement of the cutting die on the drum by the operator and of a pair of the robotic mechanisms on a drive assembly after being referenced to their home positions relative to the backing drum with the drum in its zero position.

FIG. 3 is an end schematical representation of the backing drum as seen along line 3—3 showing its zero position.

FIG. 4 is a front schematical representation of the backing drum after placement of the cutting die thereon by the operator and of the pair of robotic mechanisms after movement to start positions relative to the cutting die on the backing drum.

FIG. 5 is a front schematical representation similar to that of FIG. 4 but showing the pair of the robotic mechanisms indexing along a predetermined path relative to the backing drum to apply the mounting screws to the cutting die and backing drum in the mounting sequence shown in FIG. 8.

FIG. 6 is a front schematical representation of the rotary die cutter backing drum and cutting die mounted thereon showing the final position of the drum and die after application of the mounting screws thereto by the robotic mechanisms has been completed.

FIG. 7 is a schematical representation of a control panel showing various control buttons and indicator lights mounted thereon which are respectively pushed and light up during the stages of the mounting sequence depicted in FIGS. 2 and 4–6.

DETAILED DESCRIPTION OF THE PREFERRED EMBODIMENT

Figure 1:
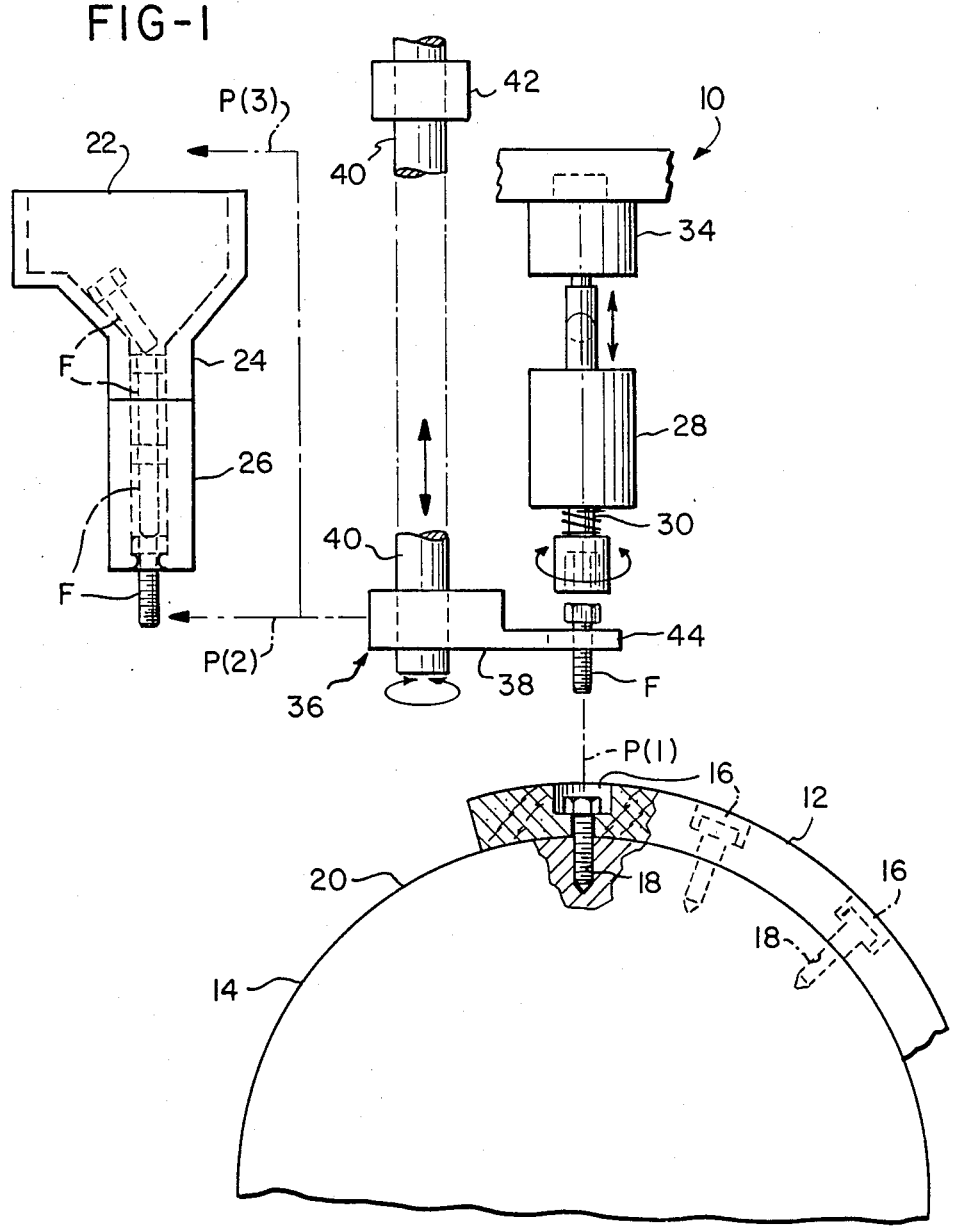
FIG. 1 is an elevational view of a robotic mechanism of the present invention for mounting a cutting die to a rotary die cutter backing drum.

Reference is made to FIG. 1 of the drawings which illustrates a robotic die mounting mechanism, being generally designated 10, which comprises the preferred embodiment of the present invention. The robotic die mounting mechanism 10 is particularly useful for mounting a cutting die 12 on a generally cylindrical backing drum 14 of a rotary die cutter. In particular, the mounting mechanism 10 includes components which cooperate together to supply, transfer and apply a plurality of fasteners F, such as conventional threaded screws, to arrangements of aligned, pre-drilled and pre-tapped holes 16 and 18 formed respectively through the die 12 and in the curved exterior surface 20 of the drum 14 in order to attach the die 12 to the drum 14. The arrangements of holes 16,18 are defined in substantially identical patterns so that they are aligned with one another once the die 12 has been placed on the drum 14, as seen in FIG. 1. Additionally, the components of the mounting mechanism 10 are capable to reverse cooperation to remove, transfer and return the fasteners F from the die 12 and drum 14 in order to detach the die 12 from the drum 14.

In its basic components, the robotic die mounting mechanism 10 includes means in the form of a supply magazine 22 for holding a supply of the fasteners F therein and having a chute 24 for queuing the fasteners in a single file one above the next for dispensing from the chute. A dispensing device 26 of conventional design per se is incorporated in the chute 24 and operable to provide separation of the lowermost fastener F from those queued above it. The magazine 22 and chute 24 can be of the vibrating type similar to devices used in screw machine technology.

In addition, the mounting mechanism 10 includes means in the form of a rotary driver 28, such as a conventional pneumatic drill, having a rotatable output shaft 30 with a spring-loaded socket 32 attached thereon. The socket 32 is engagable with one fastener F at a time and operable for applying the fastener F to one of the aligned pairs of holes 16,18 in the die 12 and drum 14. Further, the rotary driver 28 is mounted to means in the form of an extendible and retractible actuator 34, such as a pneumatic cylinder. Extending actuation of the actuator 34 causes movement of the driver 28 and thereby movement of the fastener F engaged in the driver socket 32 along a path P(1) toward the die 12 and drum 14.

In such manner, the driver 28 is moved from a fastener receiving position remote from the die 12 and drum 14, as shown in FIG. 1, to a fastener applying position adjacent the die and drum. Suitable means (not shown) can be associated with the socket 32, such as a permanent magnet, for causing engagement and retention of the fastener F with the socket 32 until the fastener is threadably engaged with the threaded hole 18. Also, the fasteners F preferably have pointed tips to facilitate reliable insertion into the aligned holes 16,18.

Finally, the mounting mechanism 10 includes means in the form of a robotic arm 36 which is composed of a finger element 38 mounted on one end of an elongated shaft 40. The shaft 40 is axially and rotatably movable by a suitable drive device 42, illustrated schematically in FIG. 1, such as a pair of stepping motors (now shown) coupled to gear tracks (not shown) on the shaft 40. The drive device 42 is operable selectively to rotate and axially drive the shaft 40 so as to move the finger element 38 thereon along a path P(2) between a fastener pickup position located adjacent to the lower end of the magazine chute 24 and a fastener discharge position, as seen in FIG. 1, located adjacent the fastener receiving position of the rotary driver socket 32. Such movement along the path P(2) allows the finger element 38 to receive and then transfer one fastener F at a time from the magazine chute 24 to the socket 32. Also, suitable means (not shown), such as a pneumatically-driven chuck, is associated with the outer end 44 of the robotic arm finger element 38 for retaining the fastener F thereon and releasing it upon engagement with the socket 32 or upon return of the fastener to the supply magazine 22.

It should be readily apparent that the above-described components can be operated in reverse fashion to remove one fastener F at a time from the aligned holes 16,18 of the die 12 and drum 14 and transfer the fastener F along another path P(3) from the fastener discharge position to the supply magazine 22 in order to detach and facilitate removal of the die 12 from the drum 14.

To recapitulate, the magazine 22 holds a supply of the fasteners F and its chute 24 dispenses one fastener F at a time therefrom. The finger element 38 on the robotic arm 36, being movable between the fastener pickup position adjacent the magazine chute 24 and the fastener discharge position adjacent the magazine chute 24 and the fastener discharge position remote therefrom and above the die 12 and drum 14, receives one fastener F at a time from the magazine chute 24 and transfers the fastener F from the fastener pickup position to the fastener discharge position. The socket 32 on the rotary driver 28 engages the fastener F at the fastener discharge position. Upon extension of the actuator 34, the rotary driver 28 and the socket 32 therewith are moved to advance the fastener F from the fastener discharge position to the fastener applying position adjacent to the die 12 and drum 14. The driver 28 is then actuated to rotate the socket 32 and threadably apply the fastener F to the aligned holes 16,18 on the die 12 and drum 14. Reversal of these steps will effectuate removal of the fastener from the die 12 and drum 14 and its delivery back to the supply magazine 22.

Turning now to FIGS. 2–7, there is shown one example of how the principles of the present invention can be implemented in carrying out robotic attachment and detachment of the die 12 to the drum 14. A pair of the robotic die mounting mechanisms 10 are arranged to traverse laterally a crosstie on a rack and pinion drive 46. Since one robotic mounting mechanism 10 would simulate the action of a person manually doing this operation, two robotic mechanisms 10 would simulate two people, thus reducing normal set-up time in half. Overall operation would be controlled by current computer/position feedback technology.

Prior to beginning a job order set-up, an operator first enters into the computer (not shown) the specifications of the cutting die 12 to be mounted on the drum 14. These specifications would essentially be he number of rows and columns of fastener openings that exist on the die 12. This information would set the starting points, paths, and finishing points of each robotic mechanism 10. An example of such information is illustrated graphically on the die 12 in FIG. 8.

Then referring to FIGS. 2 and 3, to begin a job order set-up, an operator would first press a set-up/reference button 48 shown on a control panel 50 in FIG. 7. The two robotic mechanisms 10 using infrared sensors 52 would traverse out and sense the edges of the backing drum 14 This is required since the drum 14 has end adjust registration capability so between jobs the computer needs to re-reference a home position each time. Concurrently, a compensator or in-line register (not shown) rotates the drum to a zero position, as seen in FIG. 3. A red light 54 on the panel flashes indicating this action is taking place.

After referencing, the robotic mechanisms 10 would go to their starting positions shown in FIG. 4 and actuate a green ready light 56 on the panel 50. The operator places the die 12 on the drum 14, aligning the die's through holes 16 with the drum's tapped holes 18. The lead edge of the die 12 would also align with a zero reference line scribed across the face of the drum 14.

Figure 8:
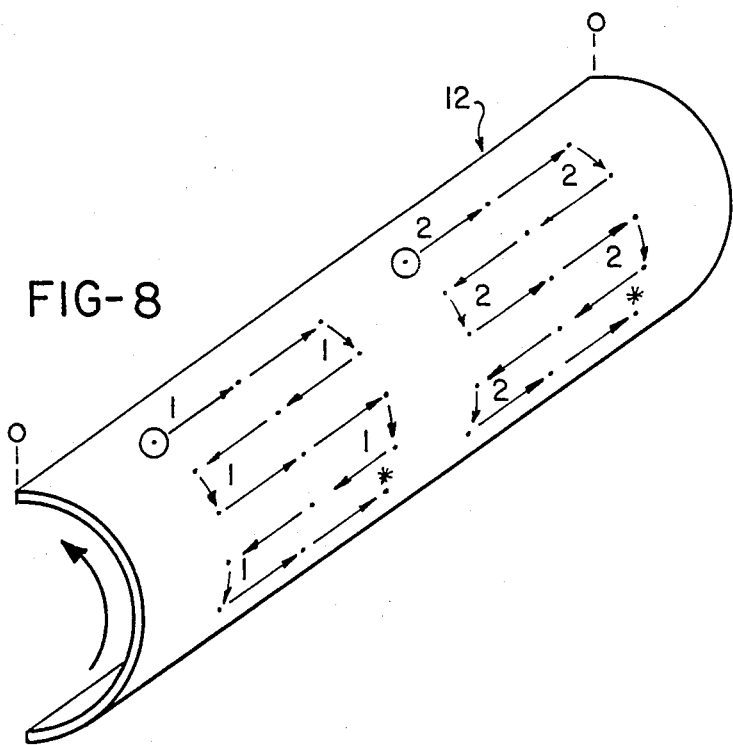
FIG. 8 is a perspective view of the cutting die with the starting points, paths and finishing points of the robotic mechanisms shown on the exterior surface of the die.

When ready, the operator presses an initiation button 58 on the panel 50 to begin the screw mounting sequence carried out by the robotic mechanisms 10, as depicted in FIG. 5. While the mounting sequence is being carried out, the operator can take this time to perform other functions. When a line of screws have been applied, the drum 14 is indexed to the next line and the robotic mechanisms 10 continue until all screws are applied to the die and drum. The paths of the mounting sequence are shown in FIG. 8. The final positions (*) shown in FIGS. 6 and 8 are stored in computer memory for later removal of the die 12.

During an order change, when the die 12 first needs to be removed, the drum 14 is indexed and the robotic mechanisms 10 (after referencing) move to the last mounting location and work backwards to remove the screws. Prior to removing the last two screws, the light 56 will flash calling for the operator to hold the die 12 while the last two screws are removed. The operator can immediately position the next die, and the sequence can begin again.

Having thus described the robotic die mounting mechanism and method of the present invention in detail and by reference to a preferred embodiment thereof, it will be apparent that modifications and variations are possible without departing from the scope of the invention defined in the appended claims.

What is claimed is:

1. A robotic die mounting mechanism for applying a plurality of fasteners to a plurality of aligned locations on a cutting die and a backing drum for attaching the die to the drum, said mechanism comprising:
   (a) means for holding a supply of the fasteners having means for dispensing the fasteners;
   (b) means for applying the fasteners to the aligned locations on the die and drum;
   (c) means attached to said fastener applying means and being movable toward and away from the die and drum for moving said fastener applying means between a fastener applying position adjacent the die and drum and a fastener receiving position remote therefrom; and
   (d) a robotic arm having a finger element mounted on one end of an elongated shaft, said shaft is axially and rotatably moveable to move said finger element between a fastener pickup position adjacent said fastener holding and dispensing means and a fastener discharge position adjacent said fastener receiving position of said fastener applying means for receiving and then transferring the fasteners from said fastener holding and dispensing means to said fastener applying means.

2. The mechanism of claim 1 wherein said holding and dispensing means is a supply magazine having a fastener dispensing chute.

3. The mechanism of claim 1 wherein said applying means is a rotary driver having a socket.

4. The mechanism of claim 1 wherein said means for moving said fastener applying means is an extendible and retractible actuator.

5. The mechanism of claim 1 wherein said transferring means is a robotic arm.

6. A robotic die mounting mechanism useful for applying a plurality of fasteners to a plurality of aligned locations on a cutting die and a backing drum for attaching the die to the drum, said mechanism comprising:
   (a) means for holding a supply of the fasteners and dispensing one fastener at a time;
   (b) means engagable with one fastener at a time and being operable for applying a fastener so engaged to one of the aligned locations on the die and drum;
   (c) means attached to said fastener applying means and being movable toward and away from the die and drum for moving said fastener applying means between a fastener applying position adjacent the die and drum and a fastener receiving position remote therefrom; and
   (d) a robotic arm having a finger element mounted on one end of an elongated shaft, said shaft is axially and rotatably moveable to move said finger element between a fastener pickup position adjacent said fastener holding and dispensing means and a fastener discharge position adjacent said fastener receiving position of said fastener applying means for receiving and then transferring one fastener at a time from said fastener holding and dispensing means to said fastener applying means.

7. The mechanism of claim 6 wherein said holding and dispensing means is a supply magazine having a dispensing chute.

8. The mechanism of claim 6 wherein said applying means is a rotary driver having a socket.

9. The mechanism of claim 6 wherein said means for moving said fastener applying means is an extendible and retractible actuator.

10. The mechanism of claim 6 wherein said transferring means is a robotic arm.

11. The mechanism of claim 1 wherein said mechanism further comprises:
   means for mounting the mechanism on a rack and pinon drive;
   means for determining the specifications of the cutting die to be mounted on the backing drum;
   computer means having a memory for storing said specifications of the cutting die;
   means for rotating the backing drum to a zero starting position;
   means for indexing the backing drum;
   means for sensing and storing the final position of said mechanism in said computer memory.

* * * * *